Jan. 4, 1938. G. A. GLEASON 2,104,121
MANUFACTURE OF FLEXIBLE CONDUIT
Original Filed April 19, 1935   2 Sheets—Sheet 1

Inventor:
GEORGE A. GLEASON,
by: his Attorneys.

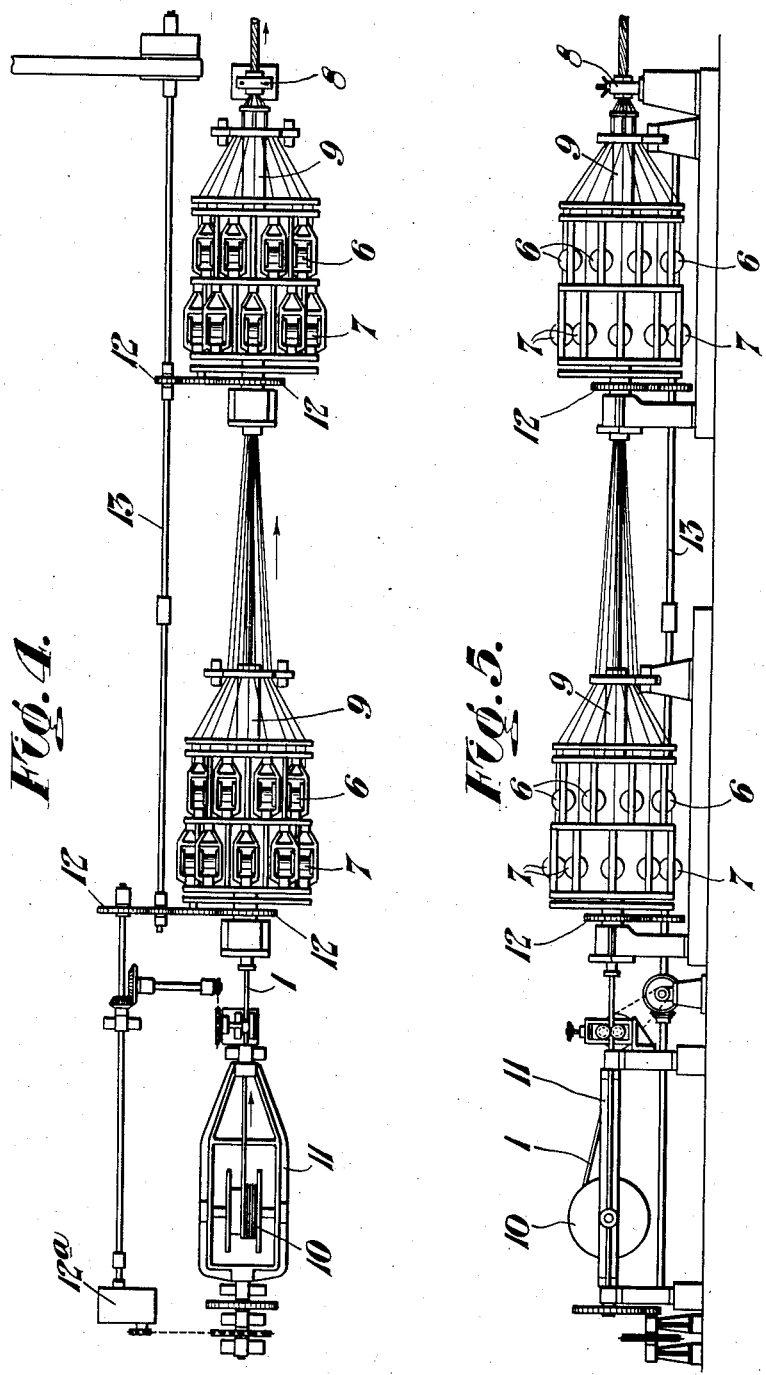

Patented Jan. 4, 1938

2,104,121

UNITED STATES PATENT OFFICE 2,104,121

MANUFACTURE OF FLEXIBLE CONDUIT

George A. Gleason, Worcester, Mass., assignor to The American Steel and Wire Company of New Jersey, a corporation of New Jersey Original application April 19, 1935, Serial No. 17,325. Divided and this application February 21, 1936, Serial No. 65,167

3 Claims. (Cl. 140—71)

This invention is a method of making an improved form of flexible conduit of the type frequently used to carry the operating cables of automobile brakes, and is divided from my copending application entitled "Flexible conduit", Serial No. 17,325 and filed April 19, 1935.

This conduit consists of a short-pitched helical coil of half-round wire having its normally flat face inside and upset so that it is appreciably convex, T-wire wound over this coil with the stem portion forced inwardly between the convolutions of the half-round wire to an extent sufficient to at least slightly separate the same but insufficient to become flush with their inside faces and with its head portion extending at least slightly above the outer faces of these convolutions, wires tightly wound with a relatively long-pitched lay over the T-wire so as to contact the latter's head portions and continuously force the T-wire to maintain its relationship with the half-round wire and cord-packing which is laid between the T-wire and the last mentioned wires so as to fill the interstices between the latter.

The above conduit is illustrated by the accompanying drawings, in which:

Figures 4 and 5 show a machine suitable for manufacturing the conduit in plan and elevation, respectively.

Figure 1:
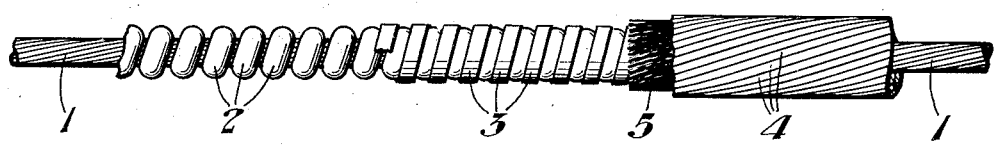
Figure 1 shows the conduit broken away so as to illustrate its component parts.
Figure 2:
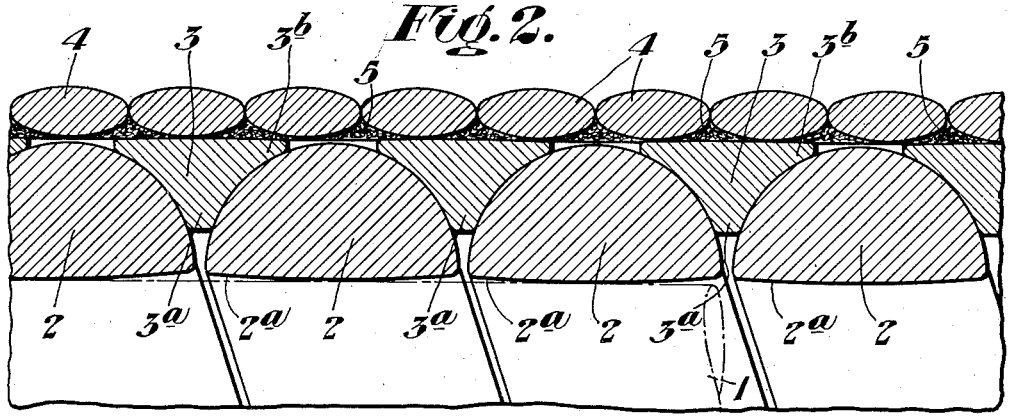
Figure 2 shows the specific relationship of the parts by means of an enlarged longitudinal section.

Referring more particularly to these drawings:

Figures 1 and 2 illustrate a cable 1 carried by the conduit consisting of the short-pitched helical coil of half-round wire 2 having its normally flat face 2ª inside and upset so that it is appreciably convex. This convexity may be secured during the coiling operation providing the half-round wire 2 is of sufficiently large dimensions as compared to the diameter of the helix into which it is formed. The convex faces thus provided are of great advantage in that they materially reduce wear on the cable 1 by reducing the friction between the parts and by preventing the sharp edges of the half-round wire from exerting any cutting action.

The T-wire 3 is wound over the coil of half-round wire 2 with its stem portion 3ª forced inwardly between the convolutions of the latter to an extent sufficient to at least slightly separate the same but insufficient to itself become flush with their inside faces 2ª. This separation of the convolutions provides an internal helical groove for the conduit, which functions as a grease retainer from which grease may be distributed to the cable 1 during the latter's reciprocating action. Furthermore, any flexing of the conduit tends to close this groove at one point or another whereby any grease in the same is extruded onto the cable. It is also to be noted that the head portion 3ᵇ of the T-wire 3 extends at least slightly above the outer faces of the convolutions of the half-round wire.

The outermost layer of the conduit consists of the plurality of wires 4 which are tightly wound with a relatively long-pitched lay over the T-wire 3 so as to contact the latter's head portion 3ᵇ and so as to continuously force the T-wire to maintain its relationship with the half-round wire. The cord packing 5 is laid between the T-wire 3 and the wires 4 so as to fill the interstices between the latter. Any tendency of the half-round wire 2 or T-wire 3 to open up due to their short-pitched helical form is prevented or retarded by these wires 4 due to their relatively long pitch. Furthermore, these wires 4 function to greatly increase the tensile strength of the conduit as a whole. They also function to continuously force the T-wire 3 into place so that no openings will occur when the conduit is arced, this action being particularly effective due to the fact that the head portions 3ᵇ of the T-wire 3 extend slightly above the outer faces of the convolutions of the half-round wire 2. Since this will in many cases make the conduit entirely grease-tight, it will be possible to entirely eliminate the cord packing 5 in many instances. Then too, these wires 4 may be rust-proofed by galvanizing or the like, or they may be made of rust-resisting steel, whereby it will not be necessary to paint or otherwise protect the conduit against rust.

All of the wires are preferably made of high-carbon or other hard steel. This reduces the wear on the half-round wire 2 and renders the T-wire 3 sufficiently rigid to prevent any shortening of the conduit. The long pitch of the wires 4 effectively dampens the conduit so as to greatly retard any crystallization which might result from vibration.

A new method of manufacturing is also involved in the making of the conduit which has just been described.

Figure 3:
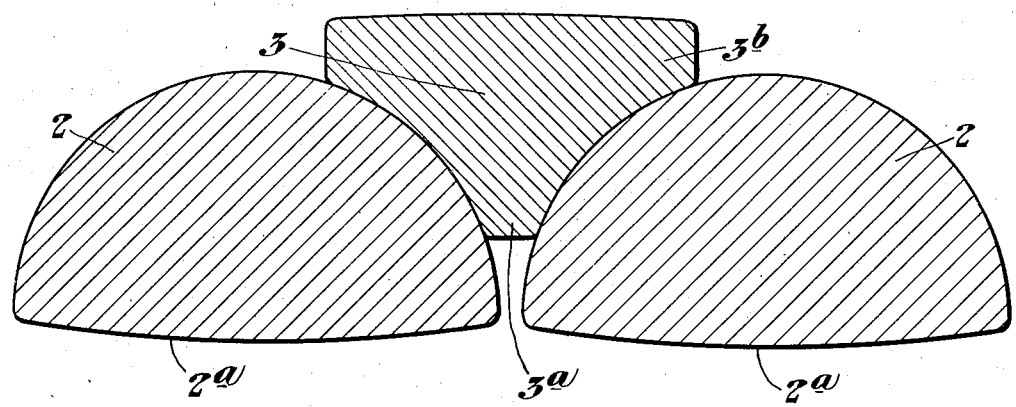
Figure 3 shows a step in the manufacture of the conduit.

In this method the half-round wire 2 is coiled into a helix in any suitable manner, while the stem portion 3ª and the head portion 3ᵇ of the T-wire 3 are originally much thicker than they are when the conduit is complete. In Figure 3 the T-wire is indicated as having such dimensions, this wire being wound over the helix of the half-round wire 2 so that its stem portion 3ª extends inwardly between the convolutions of the latter. After this has been done sufficient inwardly directed force is applied to the T-wire to cause it to flow at least slightly, whereby its head portion 3ᵇ is thinned, and its stem portion 3ª is elongated.

It is to be noted that the above operation involves an actual working of the T-wire 3, this working tending to take out any recoil. The operation may be accomplished by the use of a conventional swaging machine, or by means of pressure rolls of sufficient strength. It is to be understood that the final result is that shown by Figure 2.

After the above operation the wires 4 are laid tightly over the T-wire in oppositely pitched relationship. During the laying operation a constricting torque is applied to the T-wire and the helix of the half-round wire, the ultimate release of this torque producing a much firmer conduit than would result if the wires 4 were laid in the usual manner.

Figures 4 and 5 show a machine which is particularly suited for use in applying the wires 4. It is more or less conventional in that it includes a series of spools 6 which are carried by revolubly mounted swivels 7 and are otherwise arranged and provided with suitable parts so as to properly feed the wires to a stationary die 8. The various revoluble parts are mounted by a hollow shaft 9 through which the assembly consisting of the T-wire and helix of half-round wire is fed from a spool 10.

The machine is unconventional in that this spool 10 is carried by a rotary mount 11 which has no direct connection with the hollow shaft 9 and which is driven in a direction which is rotatively opposite to the latter. It is by this means that the torque is placed on the two inner layers of the conduit during the application of the outer layer, the rotative direction of the rotary mount 11 being in the proper direction to accomplish this result. This mount may be driven by any suitable means, such as the gearing shown by the drawings and generally indicated by the numeral 12, which interconnects it with the main power shaft 13 which drives the conventional part of the machine. Preferably, this gearing should include a variable speed drive 12ª whereby varying amounts of torque may be placed upon the conduit structure being fed to the die 8.

I claim:

1. A method of making a flexible conduit, including coiling half-round wire into a helix, winding T-wire over said helix so that the stem portions of said T-wire extend inwardly between the convolutions of said half-round wire and applying sufficient inwardly directed force to said T-wire to cause it to flow at least slightly, whereby the head portion of said T-wire is thinned and its stem portion is elongated.

2. A method of making a flexible conduit, including coiling half-round wire into a helix, winding T-wire over said helix so that the stem portions of said T-wire extend inwardly between the convolutions of said half-round wire and laying wires tightly over said T-wire in oppositely pitched relationship and while applying a constricting torque to said T-wire and said helix.

3. A method of making a flexible conduit, including coiling half-round wire into a helix, winding T-wire over said helix so that the stem portions of said T-wire extend inwardly between the convolutions of said half-round wire, applying sufficient inwardly directed force to said T-wire to cause it to flow at least slightly, whereby the head portion of said T-wire is thinned and its stem portion is elongated, and laying wires tightly over said T-wire in oppositely pitched relationship and while applying a constricting torque to said T-wire and said helix.

GEORGE A. GLEASON.